3,179,664
PROCESSES FOR PREPARING MELAMINE
Alan F. Clifford, West Lafayette, Ind., assignor to
Monsanto Company, a corporation of Delaware
No Drawing. Filed June 18, 1959, Ser. No. 821,073
9 Claims. (Cl. 260—249.7)

This invention relates to improvements in the process of making melamine from urea in the presence of added anhydrous ammonia at elevated temperatures and pressures. This invention also relates to certain novel metal salts which are useful in preparing melamine, particularly the respective metal salts of urea, of guanidine, of guanylurea, of ammeline and of ammelide wherein the salt forming metal is aluminum.

It is an object of this invention to convert urea to melamine in the presence of added anhydrous ammonia, i.e. anhydrous ammonia from an external source. It is a further and particular object to provide a melamine containing reaction product substantially free of impurities heretofore known to be difficult to remove and which cause considerable discoloration of the recovered melamine. It is a still further object of this invention to provide a process whereby melamine is obtained from urea as a starting material in a more economic manner, more specifically to provide a process which permits the employment of construction materials which are readily available, particularly ferrous metals such as iron and alloys thereof containing 25% by weight or more iron. It is also an object of this invention to provide a process for making melamine from urea as a starting material which process can be operated for long periods of time without interruption and with an optimum of safety.

These and other objects which are apparent hereinafter have been accomplished in accordance with this invention by the method which comprises heating an intimate anhydrous mixture of fluidized urea and an amalgamated aluminum (or amalgam of mercury and the aluminum or like mercury activated aluminum) in the presence of added anhydrous ammonia at a temperature in excess of the melting point of urea but not more than 600° C., and preferably in the range of from about 275° C. to about 550° C., in a pressure-resistant reaction vessel under a super-atmospheric pressure of ammonia of at least 700 pounds per square inch absolute, and preferably not more than 15,000 pounds per square inch absolute, until melamine is formed, and thereafter recovering melamine from the reaction mixture. By so proceeding melamine is obtained in a high state of purity and free of colored bodies, and such is particularly so when the reaction is carried out in a pressure-resistant reaction vessel at least the inner surface of which is lined with a ferrous metal. In general at reaction temperatures in the range of from about 275° C. to about 550° C. the super-atmospheric pressure of ammonia is preferably maintained between about 1500 and 6000 pounds per square inch absolute and more preferably with the lower pressure corresponding to the lower temperature. Particularly outstanding results are obtained when the amalgamated metal is aluminum and with respect to aluminum the overall reaction in converting urea to melamine wherein said aluminum is activated by mercury can be represented as follows:

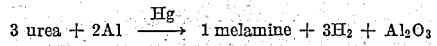

It is an additional object of this invention to provide certain new metal salts, particularly the respective aluminum salts of urea, of guanidine, of guanylurea, of ammeline, of ammelide, and various mixtures thereof.

This additional object and other objects which are apparent hereinafter have been accomplished in accordance with this invention by the method which comprises heating to evolve hydrogen an intimate mixture of an amalgamated aluminum (or amalgam of mercury and the aluminum or like mercury activated aluminum) and fluidized urea in the presence of added anhydrous ammonia in a pressure-resistant reaction vessel under a super-atmospheric pressure of ammonia in the range of 700 to 10,000 pounds per square inch absolute, the heating temperature being in the range of 100° C. to 270° C. and preferably in the range of from about 130° C. to about 180° C. In the preferred temperature range of 130° C. to 180° C. it is particularly desirable to employ an ammonia pressure of 1500 to 6000 pounds per square inch absolute. The reaction product so produced is a mixture of amorphous organic salts of the aluminum, which amorphous mixture is composed of at least two members of the following nitrogen containing organic materials (1) Urea
(2) Guanidine
(3) Guanylurea
(4) Ammeline, and
(5) Ammelide wherein one or more hydrogen atoms of said itemized nitrogen containing organic materials is replaced by an equivalent of the aluminum. As the heating temperature increases or rises the concentration of the respective metal salts of ammeline and ammelide increases while the concentration of the respective metal salts of urea, of guanidine and of guanylurea decreases. This mixture of salts in the anhydrous state is very stable, however, in the presence of moisture or water will hydrolyze forming the oxide and/or the hydroxide of the aluminum and nitrogen containing organic materials wherein hydrogen replaces the aluminum substituent of the salt mixture in equivalent amounts. This mixture of salts will also react with alchols, e.g. methyl alcohol and ethyl glycol, to form alkoxides of the aluminum and nitrogen containing organic materials wherein hydrogen replaces the substituent of the salt mixture in equivalent amounts.

This mixture of amorphous organic salts obtained by reacting a mercury activated aluminum with fluidized urea in the presence of added anhydrous ammonia as above described also satisfies another and particular object of this invention, that is it provides a convenient method for preparing melamine in improved yields, which method comprises heating said mixture of salts above 275° C., but usually not more than 600° C., and preferably in the range of from about 300° C. to about 550° C., in the presence of added anhydrous ammonia in a pressure-resistant reaction vessel under a super-atmospheric pressure of ammonia in the range of 700 to 15,000 pounds per square inch absolute, but preferably 1500 to 6000 pounds per square inch, until melamine is formed, and thereafter recovering melamine from the reaction product. The by-product of this thermal decomposition is the oxide of the aluminum.

By the expression "fluidized urea" as used herein and in appended claims is meant to include molten urea (melting point of urea is about 132° C.) as well as urea dissolved in the anhydrous ammonia which latter condenses in the pressure-resistant reaction vessel at temperatures below about 132° C. due to the super-atmospheric pressure characterizing the system. It has been observed that urea will react with aluminum (provided the aluminum is in admixture with and is activated by mercury) in the system at temperatures of 100° C. and up to the melting point of urea provided liquid ammonia is present in an amount sufficient to solubilize at least some of the urea charged.

By the expression "mercury activated aluminum" as used herein and in the appended claims is meant any mixture of mercury and aluminum wherein mercury is in intimate contact with aluminum as for example a solution of aluminum in mercury or vice versa. The mercury and aluminum can be added to the reaction system in any manner, that is to say the mercury and aluminum can be added separately to urea and mixed therein, or in the form of a physical mixture thereof, or in the form of a preformed amalgam (i.e. a solution of mercury in the aluminum or vice versa), or in any combination of the aforesaid. When mercury and aluminum are added as an amalgam such can be prepared by a wide variety of well-known methods, for example by contacting in an alkaline medium (such as aqueous sodiumhydroxide) the surface of aluminum in any physical shape such as sheets, chunks, scrap, turnings, granules, and the like, with mercury and thereafter recovering the solids, washing the recovered solids with water, and drying same. In general such a process will provide a discontinuous film or small globules of mercury on the surface of the aluminum. Another method of preparing such a mixture is to mix the aluminum in any physical shape with an aqueous solution of mercuric chloride for a few minutes, filtering the mass, water-washing the collected residue, and thereafter drying same. The mercury activated aluminum can also be formed in situ, that is to say the aluminum and mercury can be added to the fluidized urea and mixed to provide intimate contact therebetween. Alternatively aluminum and mercuric chloride can be separately added to the fluidized urea and the mercury activated aluminum formed in situ.

The amount of mercury employed in the process of this invention can vary widely but in general will be in excess of 0.1% by weight of the aluminum employed. Mercury is recovered as such, i.e. as elemental mercury, from the reaction system and can be reused. In general the upper limit used usually will not be in excess of 20% by weight of the aluminum employed.

In attaining the various objects of this invention the aluminum which is activated by mercury, is one which is above hydrogen in the electromotive series and which is characterized by a positive valence which is greater than one. When urea is employed as the starting material in general at least $1/v$ gram atoms of aluminum will be employed per gram molecule of urea wherein $v$ is the valence of aluminum. However, it is preferred to employ at least $2/v$ gram atoms of aluminum per gram molecule of urea. While the upper limit will be governed by practical considerations, in general amounts in excess of $6/v$ gram atoms of aluminum per gram molecule of urea should not be employed.

To illustrate one embodiment of this invention is the following:

*Example I*

In a stainless steel-lined one liter autoclave was charged at about room temperature 90 grams of urea, 55 grams of aluminum pellets (20 mesh), 2 grams of mercuric chloride and 245 grams of anhydrous ammonia. The contents of the autoclave were heated with agitation up to 200° C., at which temperature the pressure reached 3500 p.s.i., whereupon the excess gas phase which includes hydrogen and ammonia was bled off so as to maintain the pressure at 3500 p.s.i. while heating the mass over a period of about 30 minutes up to 330° C. The autoclave was then sealed off and the mass was then heated with agitation for 5 hours at 330° C., the pressure reaching a maximum of 3700 p.s.i. during this heating period. The autoclave was then cooled to 68° C., vented, the reaction product removed and analyzed and found to contain approximately 41 grams of unreacted aluminum, approximately 14 grams of aluminum as aluminum oxide, approximately 25 grams of melamine, approximately 27 grams of a material containing 40% nitrogen, approximately 23 grams of unidentifiable material and elemental mercury. The melamine which was recovered from the reaction product by alcohol extraction was visibly free of discoloring impurities. The inner lining of the autoclave showed no signs of pitting. Upon igniting a sample of the reaction product removed from the autoclave a white solid was obtained.

The inner lining of autoclave of Example I after 100 hours' service, approximately 25 runs like to that of Example I, showed no signs of pitting and each instance the reaction product withdrawn on igniting gave a white solid.

*Example II*

Employing the procedure of Example I but instead of mercuric chloride adding 2 grams of metallic mercury substantially the same results are obtained.

*Example III*

Employing the procedure of Example I but omitting the inclusion of aluminum and mercuric chloride the inner surface of the autoclave was pitted and the reaction product contained a substantial amount of iron oxide.

To illustrate another embodiment of this invention, specifically the preparation of the mixture of amorphous organic salts of aluminum, which amorphous mixture is composed of at least two members of the following nitrogen containing organic materials:

(1) Urea
    (2) Guanidine
    (3) Guanylurea
    (4) Ammeline, and
    (5) Ammelide wherein one or more hydrogen atoms of the said itemized nitrogen containing organic materials is replaced by an equivalent of the aluminum, is the following:

*Example IV*

In a stainless steel one-liter autoclave at about room temperature was charged 90 grams of urea, 27 grams of aluminum pellets (30–40 mesh), 4.5 grams of mercuric chloride, and 70 grams of anhydrous ammonia. The contents while continually mixing same were heated up to 135° C. over a 30 minute period and maintained at 135° C. for 6 hours with constant agitation. Thereafter the contents of the vessel were cooled to room temperature wherein it was observed that approximate 75% (20 grams) of the aluminum had been oxidized to the trivalent state. The reaction product hereinafter (referred to as reaction product of Example IV) was composed of unreacted aluminum (7 grams), liquid mercury, 3 grams of ammonium cyanate and the respective white amorphous aluminum salts of urea, of guanidine, of guanylurea, and of ammelide. The amount of said aluminum salts in the reaction product in terms of free urea, of free guanidine, of free guanylurea, and of free ammelide respectively was as follows:

| | Grams |
|---|---|
| Urea | 36 |
| Ammelide | 36 |
| Guanidine | 10 |
| Guanylurea | 6 |

The reaction product of Example IV above upon heating from room temperature up to 310° C. over a one hour period and maintaining same at 310–315° C. for about 30 minutes in the presence of added anhydrous ammonia sufficient to provide an ammonia pressure of about 2500 pounds per square inch in a pressure-resistant one-liter autoclave thermally decomposed providing aluminum oxide and melamine. The yield of melamine was in excess of 60% by weight based on the urea charged. The inner lining of the autoclave showed no signs of pitting and the product was free of discoloring impurities.

*Example V*

In a stainless steel one-liter autoclave at about room temperature was charged 90 grams of urea, 27 grams of aluminum pellets (30–40 mesh), 4.5 grams of mercuric chloride, and 70 grams of anhydrous ammonia. The contents while continually mixing same where heated up to 150° C. over a 30 minute period and maintained at 150° C. for 5 hours with constant agitation. Thereafter the contents of the vessel were cooled to room temperature wherein it was observed that approximately 77% (20 grams) of the aluminum had been oxidized to the trivalent state. The reaction product (hereinafter referred to as the reaction product of Example V) was composed of unreacted aluminum (7 grams), liquid mercury, 4 grams of ammonium cyanate and the respective white amorphous aluminum salts of urea, of guanidine, of guanylurea and of ammelide. The amount of said aluminum salts in terms of free urea, of free guanidine, of free guanylurea, and of free ammelide respectively was as follows:

| | Grams |
|---|---|
| Urea | 36 |
| Ammelide | 27 |
| Guanidine | 10 |
| Guanylurea | 1 |

The reaction product of Example V above upon standing at room temperature in the absence of moisture exhibited a high degree of stability. Upon removal of the unreacted aluminum and liquid mercury from the said reaction product substantially the same degree of stability at room temperature was observed.

*Example VI*

In a stainless steel one-liter autoclave at about room temperature was charged 90 grams of urea, 27 grams of aluminum pellets (30–40 mesh), 4.5 grams of mercuric chloride, and 70 grams of anhydrous ammonia. The contents while continually mixing same were heated up to 169° C. over a 30 minute period and maintained at 168–170° C. for 4 hours with constant agitation. Thereafter the contents of the vessel were cooled to room temperature wherein it was observed that approximately 70% (19 grams) of the aluminum had been oxidized to the trivalent state. The reaction product (hereinafter referred to as the reaction product of Example VI) was composed of unreacted aluminum, liquid mercury, 2.2 grams of ammonium cyanate and the respective white amorphous aluminum salts of urea, of guanidine, and of ammeline. The amount of said aluminum salts in terms of free urea, of free guanidine, and of free ammeline respectively was as follows:

| | Grams |
|---|---|
| Urea | 24.7 |
| Guanidine | 8.4 |
| Ammeline | 35.3 |

The reaction product of Example VI above upon heating from room temperature up to 325° C. over a 30 minute period and maintaining same at 320–330° C. for about 30 minutes in the presence of added anhydrous ammonia sufficient to provide an ammonia pressure of about 3500 pounds per square inch in a pressure-resistant one-liter autoclave having a nickel inner lining thermally decomposed providing aluminum oxide and melamine. The yield of melamine based on the urea charged was in excess of 65% by weight. The autoclave showed no signs of pitting and the product was free of discoloring impurities.

The reaction product of Example VI above upon removal of the unreacted aluminum and elemental mercury therefrom and subsequently heating from room temperature up to 325° C. over a 30 minute period and maintaining same at 320–330° C. for about 30 minutes in the presence of added anhydrous ammonia sufficient to provide an ammonia pressure of about 3500 pounds per square inch in a pressure-resistant one-liter autoclave having a nickel inner liner thermally decomposed providing melamine and aluminum oxide. The yield of melamine based on the urea charged was in excess of 65% by weight.

It has been observed that the mixture of metal salts of at least two members of the following nitrogen containing organic materials:

(1) Urea
(2) Guanidine
(3) Guanylurea
(4) Ammeline, and
(5) Ammelide wherein one or more hydrogen atoms of said itemized nitrogen containing organic materials is replaced by aluminum are particularly useful in preparing melamine. Of these mixtures of two or more amorphous aluminum salts those containing from 10 to 40 grams of the aluminum salt of urea in terms of free urea, from 2 to 15 grams of the aluminum salt of guanidine in terms of free guanidine, from 0 to 10 grams of the aluminum salt of guanylurea in terms of free guanylurea, from 0 to 30 grams of the aluminum salt of ammelide in terms of free ammelide, and from 0 to 40 grams of the aluminum salt of ammeline in terms of free ammeline, are particularly useful in preparing melamine. These mixtures upon heating above 275° C., but usually not more than 600° C., and preferably in the range from about 300° C. to about 550° C., in the presence of added anhydrous ammonia in a pressure-resistant reaction vessel under superatmospheric pressure of ammonia in the range of 700 to 15,000 pounds per square inch but preferably 1500 to 6000 pounds per square inch, provide melamine in high yields and free of discoloring impurities.

While the overall reaction of the process of this invention in converting urea to melamine with respect to the preferred embodiment, namely, mercury activated aluminum, can be represented as $$3 \text{ urea} + 2\text{Al} \xrightarrow{\text{Hg}} 1 \text{ melamine} + 3\text{H}_2 + \text{Al}_2\text{O}_3$$

the reaction actually proceeds in two stages. As the fluidized urea reacts with the mercury activated aluminum, hydrogen begins to evolve and a mixture of white amorphous nitrogen containing organic salts of trivalent aluminum form, which mixture on subsequent heating above 275° C. thermally decomposes to melamine and aluminum oxide. In order for urea to react in the system it must be in a fluid state in the system and this is realized as aforementioned at a temperature as low as 100° C. (the urea being dissolved to some extent in the added anhydrous ammonia in the system). It has been found particularly advantageous when heating the fluidized urea-mercury activated aluminum at a temperature in the range of 130° C. to 180° C. in the presence of added ammonia that the time taken be at least 20 minutes and preferably not longer than 8 hours.

In accordance with the conventional method of making melamine from urea it requires six molecular proportions of urea to theoretically obtain one molecular proportion of melamine, the oxygen of urea ultimately ending up as carbon dioxide. This reaction can be represented as follows:

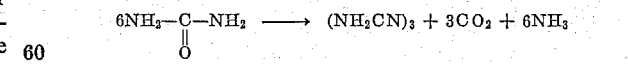

In contrast to such the present process provides a means wherein but three molecular proportions of urea are necessary to provide one molecular proportion of melamine, the oxygen of urea ending up as the oxide of aluminum.

To further illustrate an embodiment of the invention is the following:

*Example VII*

In a stainless steel-lined one liter autoclave at room temperature was charged 90 grams of urea, 27 grams of aluminum pellets (30–40 mesh), 4.6 grams of mercuric chloride and 245 grams of anhydrous ammonia. The contents of the autoclave over a 40 minute period were heated with agitation up to 150° C., at which temperature the pressure reached 2450 p.s.i. The mass was then held at 148–152° C. for 7 hours during which the pressure rose to 2800 p.s.i. The autoclave was cooled to room temperature and vented removing hydrogen and ammonia. The autoclave was then charged with 52.5 grams of anhydrous ammonia, sealed and heated with agitation up to 300° C. over a one hour period, the end of which time the pressure was 2525 p.s.i. After two hours the temperature rose to 312° C. and the pressure rose to 2600 p.s.i. The autoclave was cooled to room temperature and vented. The reaction product contained 4.3 grams of unreacted aluminum, 43 grams of aluminum oxide, approximately 48 grams of melamine (which based on the urea charged corresponds to a weight yield of 76%) and elemental mercury. The melamine (approximately 48 grams) which was recovered from the reaction product by alcohol extraction was visibly free of discoloring impurities. The inner lining of the autoclave showed no signs of pitting. Upon igniting a sample of the reaction product removed from the autoclave a white solid was obtained.

*Example VIII*

In a stainless steel-lined one liter autoclave at room temperature was charged 90 grams of urea, 54 grams of aluminum pellets (20–30 mesh), 6.0 grams of mercuric chloride and 112 grams of anhydrous ammonia. The contents of the autoclave over a 30 minute period were heated with agitation up to 150° C., at which temperature the pressure reached 2050 p.s.i. The mass was then held at 148–153° C. for one hour with agitation during which time the pressure rose to 2475 p.s.i. The autoclave was vented slowly so as to reduce the pressure to 1700 p.s.i. the temperature dropping a few degrees. Then the contents of the autoclave were heated with agitation up to 300° C. over a 30 minute period. The mass was then heated at 300–315° C. for 30 minutes wherein the final pressure was 3025 p.s.i. The autoclave was cooled to room temperature and vented. The reaction product contained 33 grams of unreacted aluminum, 21 grams of aluminum in the form of aluminum oxide, approximately 45.7 grams of melamine (which based on the urea charged corresponds to a weight yield of 72.5%) and elemental mercury. The melamine which was recovered (approximately 45.7 grams) from the reaction product by water extraction was visibly free of discoloring impurities. The inner lining of the autoclave showed no signs of pitting. Upon igniting a sample of the reaction product removed from the autoclave a white solid was obtained.

*Example IX*

In a stainless steel-lined one liter autoclave at room temperature was charged 145 grams of urea, 40.5 grams of aluminum pellets (20–30 mesh), 4.5 grams of mercuric chloride and 192.5 grams of anhydrous ammonia. The contents of the autoclave over a 30 minute period were heated up to 150° C. The mass was then held at 150° C. for one hour during which the pressure rose from 2525 p.s.i. to 3100 p.s.i. The autoclave was then vented slowly so as to reduce the pressure to 1750 p.s.i., the temperature dropping a few degrees. The contents were then heated up to 300° C. The mass was then heated for 30 minutes at 300 to 317° C. temperature range. The pressure rose to 3375 p.s.i. The autoclave was cooled to room temperature and vented. The reaction product contained 6.7 grams of unreacted aluminum, 33.8 grams of aluminum in the form of aluminum oxide, approximately 73 grams of melamine (which based on the urea charged corresponds to a weight yield of 72%) and elemental mercury. The melamine which was recovered (approximately 73 grams) from the reaction product by alcohol extraction was visibly free of discoloring impurities. The inner lining of the autoclave showed no signs of pitting. Upon igniting a sample of the reaction product removed from the autoclave a white solid was obtained.

*Example X*

In a stainless steel-lined one liter autoclave at room temperature is charged 157.5 grams of urea, 40.8 grams of aluminum amalgam (which contained 99.3% by weight of aluminum and 0.7% by weight of mercury), and 122.5 grams of anhydrous ammonia. The contents of the autoclave over a 30 minute period were heated up to 150° C., at which temperature the pressure reached 2425 p.s.i. The mass was then held at 150–154° C. for one hour with agitation during which time the pressure rose to 2800 p.s.i. The autoclave was then slowly vented so as to reduce the pressure to 1800 p.s.i. Then the temperature was increased to 300° C. and held over a 30 minute period at 300–312° C. over which period the pressure rose to 3210 p.s.i. The autoclave was cooled to room temperature and vented. The reaction product contained 10 grams of unreacted aluminum, 30.8 grams of aluminum as aluminum oxide, approximately 69.4 grams of melamine (which based on the urea charged corresponds to a weight yield of 63%) and elemental mercury. The melamine which was recovered (approximately 69.4 grams) from the reaction product by alcohol extraction was visibly free of discoloring impurities. The inner lining of the autoclave showed no signs of pitting. Upon igniting a sample of the reaction product removed from the autoclave a white solid was obtained.

As aforementioned in obtaining the objects of this invention it is necessary that the aluminum be activated with mercury and to bring out the need therefore is the following:

*Example A*

In a stainless seel-lined one liter autoclave at room temperature was charged 145 grams of urea, 40.5 grams of aluminum pellets (20–30 mesh) and 192.5 grams of anhydrous ammonia. The contents of the autoclave over a 30 minute period were heated up to 150° C. The mass was then held at 150° C. for one hour during which the pressure rose from 1900 p.s.i. to 1950 p.s.i. The autoclave was then vented slowly so as to reduce the pressure to 1750 p.s.i., the temperature dropping a few degrees. The contents were then heated up to 300° C. After 30 minutes the temperature rose from 300° C. to 312° C. and the pressure rose to 3175 p.s.i. The autoclave was cooled to room temperature and vented. The reaction product contained 40.5 grams of unreacted aluminum and substantially no melamine. The inner lining of the autoclave showed signs of pitting. Upon igniting a sample of the reaction product removed from the autoclave a highly colored solid was obtained.

It is to be understood that the pressure-resistant reaction vessel employed need not necessarily be an autoclave, but that any other suitable forms of pressure-resistant pyrolysis vessels can be used including tubular reactors, U-tubes, vertical towers and the like. The process of this invention is particularly useful in reaction vessels at least the inner surface of which is lined with a ferrous metal such as stainless steel.

By the expressions "ammonia from an external source" or "added ammonia" as used herein and in the appended claims is meant ammonia in excess of that resulting from the conversion of urea to melamine.

In the process of this invention melamine can be recovered by a variety of means, for example, by extraction with an alcohol, hot water, and the like. It may also be recovered by heating the reaction product above the boiling point of melamine and condensing the vapors.

This application is a continuation-in-part of my co-pending application Serial No. 751,897, filed July 30, 1958, now abandoned.

While this invention has been described with respect to certain embodiments it is not so limited and it is to be understood that variation and modification thereof obvious to those skilled in the art can be made without departing from the spirit or scope of this invention.

What is claimed is:

1. The process which comprises heating an intimate, anhydrous, mixture of urea, aluminum and an amalgam of mercury and aluminum at a temperature in the range of 100° C. to 270° C. in an atmosphere of anhydrous ammonia in a pressure resistant reaction vessel at a pressure in the range of from 700 to 15,000 pounds per square inch, until hydrogen is evolved and a mixture consisting essentially of aluminum, an aluminum salt of urea, an aluminum salt of guanidine and an aluminum salt of a member selected from the group consisting of guanylurea, ammelide, ammeline and mixtures thereof is formed, said aluminum being present in said first mentioned mixture in an amount of at least 1/3 gram atoms per gram molecule of urea, said mercury being present in said amalgam in an amount of at least 0.1% by weight of aluminum.

2. The process which comprises heating an intimate, anhydrous mixture of urea, aluminum and an amalgam of mercury and aluminum at a temperature in the range of 130° C. to 180° C. in an atmosphere of anhydrous ammonia in a pressure resistant reaction vessel at a pressure in the range of from 1500 to 6000 pounds per square inch, until hydrogen is evolved and a mixture consisting essentially of aluminum, an aluminum salt of urea, an aluminum salt of guanidine and an aluminum salt of a member selected from the group consisting of guanylurea, ammelide, ammeline and mixtures thereof is formed, said aluminum being present in an amount of at least 2/3 gram atoms per gram molecule of urea, said mercury being present in said amalgam in an amount of 0.1% to 20% by weight of said aluminum.

3. The process of making melamine which comprises heating a mixture of urea and an amalgam of mercury and aluminum at a temperature in the range of 100° C. to 270° C. in an atmosphere of anhydrous ammonia in a pressure resistant vessel at a pressure in the range of 700 to 15,000 pounds per square inch until hydrogen is evolved and a reaction mixture of aluminum and reaction products of aluminum and urea are formed and thereafter heating said reaction mixture at a temperature in the range of 275° C. to 600° C. in an atmosphere of anhydrous ammonia in a pressure resistant reaction vessel at a pressure in the range of 700 to 15,000 pounds per square inch for a period of time sufficient to form a reaction mixture of melamine and the oxide of aluminum and thereafter separating melamine from said last mentioned reaction mixture, said aluminum being present in said first mentioned mixture in an amount of at least 1/3 gram atoms per gram molecule of urea; said mercury being present in said amalgam in an amount of at least 0.1% by weight of said aluminum.

4. The process of making melamine which comprises heating a mixture of urea, aluminum and an amalgam of mercury and aluminum at a temperature in the range of 130° C. to 180° C. in an atmosphere of anhydrous ammonia in a pressure resistant vessel at a pressure in the range of 1500 to 6000 pounds per square inch until hydrogen is evolved and a reaction mixture of aluminum and the reaction products of aluminum and urea are formed, said aluminum being present in said first mentioned mixture in an amount of at least 1/3 gram atoms per gram molecule of urea; thereafter heating said reaction mixture at a temperature in the range of 300° C. to 550° C. in an atmosphere of anhydrous ammonia in a pressure resistant reaction vessel at a pressure in the range of 1500 to 6000 pounds per square inch thereby forming a reaction mixture of melamine and aluminum oxide and thereafter separating melamine from said last mentioned reaction mixture, said mercury being present in an amount of from 0.1% to 20.0% by weight of said aluminum.

5. The process of claim 4 wherein the time of heating in the range of 130° C. to 180° C. is from 20 minutes to 8 hours and the aluminum is present in an amount of at least 2/3 gram atoms per gram molecule of urea.

6. The process of making melamine which comprises heating a mixture of urea and an amalgam of mercury and aluminum, at a temperature in excess of the melting point of urea but not in excess of 600° C., in an atmosphere of anhydrous ammonia in a pressure resistant reaction vessel and under superatmospheric pressure until hydrogen and a reaction mixture containing melamine and the oxide of said aluminum is formed, said aluminum being present in an amount of at least 1/3 gram atoms per mol of urea, and thereafter separating melamine from said reaction mixture.

7. The process of claim 6 wherein the reaction temperature is in the range of 275° C. to 550° C.

8. The process of making melamine which comprises mixing molten urea, aluminum and an amalgam of mercury and aluminum, heating the resulting mixture at a temperature in the range of about 275° C. to 550° C. in an atmosphere of anhydrous ammonia in a pressure-resistant vessel, at least the inner surface of which is lined with a ferrous metal, and at a pressure in the range of 700 p.s.i. to 15,000 p.s.i. thereby forming hydrogen and a reaction mixture containing melamine and aluminum oxide, the total quantity of aluminium being present in an amount of from about $1/v$ to $6/v$ gram atoms per mol of urea and wherein "$v$" is the valence of aluminum and wherein the mercury is present in an amount of about 0.1% to about 20% by weight, based on the weight of the aluminum, and thereafter separating melamine from the reaction mixture.

9. The process of claim 8 wherein the ferrous metal is stainless steel.

References Cited in the file of this patent

UNITED STATES PATENTS

| 2,556,126 | Walter | June 5, 1951 |
| 2,769,005 | Walter | Oct. 30, 1956 |

FOREIGN PATENTS

| 598,175 | Great Britain | Feb. 12, 1948 |
| 754,720 | Great Britain | Aug. 8, 1956 |
| 1,112,418 | France | Nov. 16, 1955 |

OTHER REFERENCES

Chemical Abstracts, vol. 42, cols. 1833–4 (1948), (abstract of Blumenthal, Rozniki Chem., vol. 20, pp. 1–13, 1946).

Chemical Abstracts, vol. 55, cols. 18, 274–5 (1961), (abstract of Rabinovich, Izvest. Kiev. Politekh. Inst., vol. 20, pages 134–9, 1957).

Berkman et al.: "Catalysis," pp. 292–3 Reinhold Publishing Corp. (1940).

Boivin: "Canadian Journal of Chemistry," vol. 33, pp. 1467–1472 (1955).

Chemical Abstracts, vol. 22, p. 750 (1928) [abstract of Quillard, Comptes Rendus, vol. 185, pages 953–5 (1927)].

Beilstein: vol. 3, p. 26 (system #205), page 41 (system #207), Erstes Erganzungswerk, 4th ed. (1929).

Beilstein: vol. 26, page 245 (abstracts of Laurent et al., Smolin et al., Lie et al.; Rathke and Lie et al.), system #3889, 4th ed. (1937).

Chemical Abstracts, vol. 43, page 7863 (1949) [abstract of Musha et al., J. Chem. Soc., Japan, vol. 68, pages 24 to 25 (1947)].